(12) United States Patent
Bank et al.

(10) Patent No.: US 9,317,826 B2
(45) Date of Patent: *Apr. 19, 2016

(54) PROVIDING A REQUISITE LEVEL OF SERVICE FOR AN ELECTRONIC MEETING

(71) Applicant: International Business Machines Corporation, Armonk, NY (US)

(72) Inventors: Judith H. Bank, Cary, NC (US); Patrick J. O'Sullivan, Ballsbridge (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/873,575

(22) Filed: Apr. 30, 2013

(65) Prior Publication Data

US 2013/0298042 A1 Nov. 7, 2013

Related U.S. Application Data

(63) Continuation of application No. 13/457,641, filed on Apr. 27, 2012, now Pat. No. 8,959,150.

(51) Int. Cl.
*G06Q 10/06* (2012.01)
*H04L 29/06* (2006.01)
(Continued)

(52) U.S. Cl.
CPC ........ *G06Q 10/06314* (2013.01); *G06F 3/0481* (2013.01); *G06Q 10/109* (2013.01); *H04L 12/1822* (2013.01); *H04L 65/1069* (2013.01); *H04L 65/403* (2013.01); *H04L 65/80* (2013.01); *H04L 67/104* (2013.01)

(58) Field of Classification Search
CPC ... H04L 12/1822; H04L 65/80; H04L 65/403; H04L 65/1069; G06Q 10/06314; G06Q 10/109
USPC .......................................... 709/204, 223, 207
See application file for complete search history.

(56) References Cited

U.S. PATENT DOCUMENTS 5,644,715 A   7/1997  Baugher
8,126,992 B2 * 2/2012  Andreev et al. ............... 709/223
(Continued)

OTHER PUBLICATIONS

U.S. Appl. No. 13/457,641, Non-Final Office Action, Jun. 9, 2014, 9 pg.
(Continued)

*Primary Examiner* — Kristie Shingles
(74) *Attorney, Agent, or Firm* — Cuenot, Forsythe & Kim, LLC

(57) ABSTRACT

Providing a requisite level of service for an electronic meeting. An embodiment can include receiving a request to schedule a first electronic meeting in a time slot, identifying an electronic meeting system to host the first electronic meeting, identifying a second electronic meeting scheduled to be hosted by the electronic meeting system in the time slot, determining an estimate of resource usage within the electronic meeting system during the time slot at least based on the second electronic meeting being scheduled to be hosted by the electronic meeting system in the time slot, comparing the estimate of resource usage with a threshold value, responsive to determining that the estimate of resource usage exceeds the threshold value, providing the requisite level of service to the first electronic meeting in the time slot by reducing anticipated resource usage of the electronic meeting system by the second electronic meeting.

19 Claims, 3 Drawing Sheets

(51) Int. Cl.
G06Q 10/10 (2012.01)
H04L 12/18 (2006.01)
G06F 3/0481 (2013.01)
H04L 29/08 (2006.01)

(56) References Cited

U.S. PATENT DOCUMENTS

| | | | |
|---|---|---|---|
| 8,286,183 B2* | 10/2012 | Baird et al. | 718/107 |
| 8,959,150 B2* | 2/2015 | Bank et al. | 709/204 |
| 2011/0178790 A1 | 7/2011 | Golbourn et al. | |
| 2013/0290438 A1 | 10/2013 | Bank et al. | |

OTHER PUBLICATIONS

Joe-Wong, C. et al., "Time-Dependent Broadband Pricing," [online] IEEE 31st Int'l. Conf. on Distributed Computing Systems (ICDCS), Jun. 20-24, 2011 [retrieved Apr. 24, 2012] retrieved from the Internet: <http://ita.ucsd.edu/workshop/11/files/paper/paper_2186.pdf>, 5 pgs.

Gong, Z. et al., "SigLM: Signature-Driven Load Management for Cloud Computing Infrastructures," [online] Proc. of IEEE Int'l Conf. on Quality of Service (IWQOS), 2009 [retrieved Apr. 24, 2012] retrieved from the Internet: <dance.csc.ncsu.edu/papers/iwqos09.pdf>, 9 pgs.

Reig, G. et al., "Deadline Constrained Prediction of Job Resource Requirements to Manage High-Level SLAs for SaaS Cloud Providers," [online] IEEE 9th Int'l. Sym. on Network Computing and Applications (NCA), Jul. 15-17, 2010 [retrieved Apr. 24, 2012] retrieved from the Internet: <upcommons.upc.edu/e-prints/bitstream/2117/.../1/greigNCA10.pdf>, 8 pgs.

Cai, W. et al., "The Gridkit Distributed Resource Management Framework," [online] In Proc. of European Grid Conference, EGC 2004, LNCS 3470, pp. 786-795, 2005 [retrieved Apr. 24, 2012] retrieved from the Internet: <comp.eprints.lancs.ac.uk/1727/1/34700786.pdf>, 10 pgs.

Sun, D. et al., "Diameter Quality-of-Service Application," [online] Internet Society Requests for Comment (RFC5866) May 1, 2010, retrieved from the Internet: <http://priorartdatabase.com/IPCOM/000195750>. 103 pgs.

Johnson, W.J. et al., "Text to Meeting Notice Mechanism," [online] IBM TDB, vol. 37 No. 303-94, pp. 517-518, Mar. 1, 1994, retrieved from the Internet: <http://www.ip.com/pubview/IPCOM000111738D>, 3 pgs.

* cited by examiner

PROVIDING A REQUISITE LEVEL OF SERVICE FOR AN ELECTRONIC MEETING

CROSS-REFERENCE TO RELATED APPLICATIONS

This application is a continuation of U.S. application Ser. No. 13/457,641, titled PROVIDING A REQUISITE LEVEL OF SERVICE FOR AN ELECTRONIC MEETING, and filed Apr. 27, 2012, the entirety of which is fully incorporated herein by reference.

BACKGROUND

Arrangements described herein relate to electronic meetings.

Web conferencing is a service that allows conferencing events to be shared among remote locations, for example via a public network, such as the Internet, and/or a private network, such as a local area network (LAN) or a wide area network (WAN). The service allows information to be shared simultaneously, across geographically dispersed locations in real-time. Web conferencing may be used to host meetings, training events, lectures, presentations, or the like.

A webinar is a neologism, short for Web-based seminar, and generally refers to a presentation, lecture, workshop or seminar that is transmitted over the Web. In a webinar, information typically is communicated from the speaker to the audience with limited audience interaction. A webinar, however, can be collaborative. For example, in a webinar members of the audience can be polled to enter responses to questions that are presented, and the members can provided an opportunity to participate in a question and answer session.

BRIEF SUMMARY

One or more embodiments disclosed within this specification relate to providing a requisite level of service for an electronic meeting.

An embodiment can include a computer program product for providing a requisite level of service for an electronic meeting. The computer program product can include a computer readable storage medium having stored thereon program code that, when executed, configures a processor to perform operations including receiving a request to schedule a first electronic meeting in a future time slot, identifying an electronic meeting system to host the first electronic meeting, identifying at least a second electronic meeting scheduled to be hosted by the electronic meeting system in the future time slot, determining an estimate of resource usage within the electronic meeting system during the future time slot at least based on the second electronic meeting being scheduled to be hosted by the electronic meeting system in the future time slot, comparing the estimate of resource usage with a threshold value, responsive to determining that the estimate of resource usage exceeds the threshold value, providing the requisite level of service to the first electronic meeting in the future time slot by reducing anticipated resource usage of the electronic meeting system by the second electronic meeting in the future time slot, and scheduling the first electronic meeting in the future time slot.

In another embodiment, the computer program product can include a computer readable storage medium having stored thereon program code that, when executed, configures a processor to perform operations including receiving a request to schedule a first electronic meeting in a present time slot, identifying an electronic meeting system to host the first electronic meeting, identifying at least a second electronic meeting being hosted by the electronic meeting system in the present time slot, via a processor, determining resource usage within the electronic meeting system during the present time slot at least based on the second electronic meeting being hosted by the electronic meeting system in the present time slot, comparing the estimate of resource usage with a threshold value, responsive to determining that the estimate of resource usage exceeds the threshold value, providing the requisite level of service to the first electronic meeting in the present time slot by reducing resource usage of the electronic meeting system by the second electronic meeting in the present time slot, and scheduling the first electronic meeting in the present time slot.

DETAILED DESCRIPTION

Figure 1:
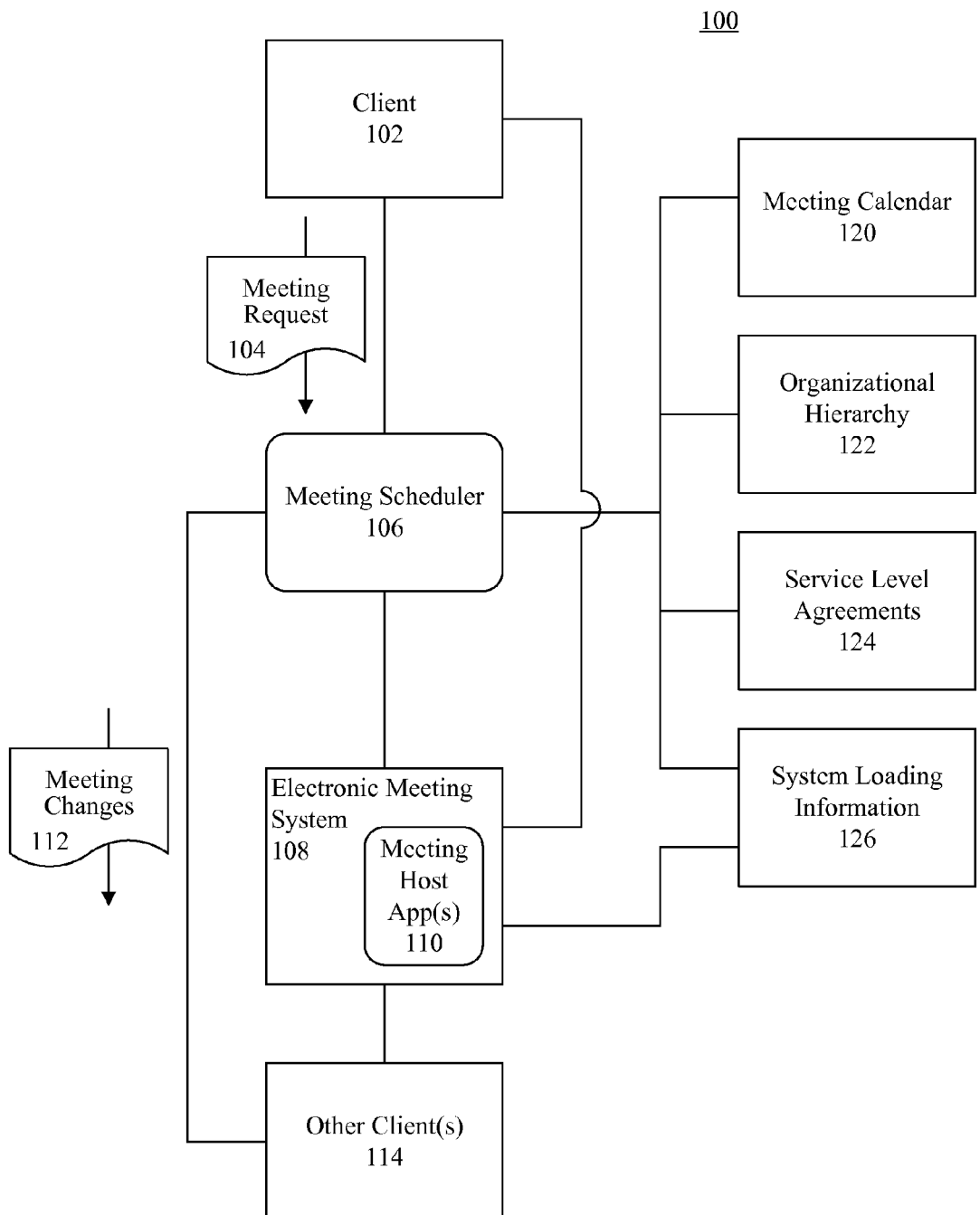
FIG. 1 is a block diagram illustrating a system for providing a requisite level of service for an electronic meeting in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with the arrangements described herein, a requisite level of service can be provided for an electronic meeting being scheduled. When a request is received to schedule an electronic meeting in a particular time slot, an electronic meeting system allocated to host the electronic meeting can be identified. One or more other electronic meetings scheduled to be hosted by the electronic meeting system in the requested time slot can be identified, and an estimate of resource usage within the electronic meeting system during the time slot can be estimated. Such estimation can be based on the resources consumed by, or expected to be consumed by, the other electronic meetings and the resources required to host the electronic meeting being scheduled with the requisite level of service. The estimate of resource usage can be compared with a threshold value to determine whether the electronic meeting system is, or will be, over-committed or saturated in the requested time slot, and thus not be able to maintain the level of service required for the electronic meeting being scheduled. If the estimate of resource usage exceeds the threshold value, the requisite level of service can be provided to the electronic meeting being scheduled by reducing the usage of resources by one or more of the other electronic meetings, for example when one or more of such electronic meetings are considered to be lower priority than the electronic meeting being scheduled. In illustration, one or more of the other electronic meetings can be rescheduled and/or access to one or more features of the other electronic meetings can be limited.

FIG. 1 is a block diagram illustrating a system 100 for providing a requisite level of service for an electronic meeting in accordance with one embodiment disclosed within this specification. The system 100 can include a client 102 that can send a meeting request 104 to a meeting scheduler 106 to schedule an electronic meeting. As used herein, the term "electronic meeting" means a meeting electronically hosted over one or more public and/or private communication networks. Examples of such networks include the Internet, a wide area network (WAN), a local area network (LAN), a personal area network (PAN), and the like. In this regard, participants may participate in an electronic meeting via respective client devices that are communicatively linked to an electronic meeting system. Examples of an electronic meeting include, but are not limited to, a web conference and a Web-based seminar (a.k.a. "webinar"), though the present arrangements are not limited to these examples. Web conferences and webinars both are well known to the skilled artisan.

The client 102 can be a processing system, including at least one processor and memory, via which a user (e.g., a person) can generate the meeting request 104. In this regard, the client 102 can be a computer (e.g., server, workstation, desktop computer, tablet computer, etc.), a smart phone, a personal digital assistant, or any other processing system via which a user may generate a meeting request 104.

The meeting request 104 can specify an electronic meeting to take place and a desired time slot for the electronic meeting. The desired time slot can be a present time slot or a future time slot. As used herein, the term "time slot" means a period having a start time and an end time. Electronic meetings sometimes start on time, but not always. Further, electronic meetings sometimes finish early, sometimes finish on time, and sometimes finish late. Thus, the desired time slot is only an indication of an expected period for the requested electronic meeting; the start time and end time of the electronic meeting may vary from the respective time slot start time and stop time.

The meeting scheduler 106 can be an application or other software configured to manage scheduling of electronic meetings to be hosted on one or more electronic meeting systems, such as an electronic meeting system 108. The meeting scheduler 106 can execute on a suitable system comprising a processor and memory, for example a general purpose computer or a server. In this regard, the meeting scheduler 106 can execute on the client 102 or the electronic meeting system 108, but this need not be the case.

The electronic meeting system 108 can be a processing system including at least one processor and memory on which one or more meeting host applications 110 are executed. In illustration, the electronic meeting system 108 can be a general purpose computer or a server. The meeting host application(s) 110 can be configured to host electronic meetings, such as those described herein. The meeting scheduler 106 can communicate with the meeting host application(s) 110 to indicate when electronic meetings are to take place, control allocation of the electronic meeting system resources to various electronic meetings, etc., as will be described herein. When a meeting is hosted by the meeting host application(s) 110, client devices used by meeting participants can communicatively link to the electronic meeting system 108 via one or more communication networks.

The meeting scheduler 106 can access various data to process the meeting request 104. Such data can include, but is not limited to, a meeting calendar 120, an organizational hierarchy 122, service level agreements 124 and system loading information 126. The meeting calendar 120, an organizational hierarchy 122, service level agreements 124 and system loading information 126 can be maintained in any type of data structures suitable for storing the respective types of data. Examples of such data structures include, but are not limited to, data files, data tables, and the like.

The system loading information 126 can provide an indication of the resources used by the electronic meeting system 108 to host meetings having various numbers of attendees, the resources used to present artifacts in the meetings, and the like. As used herein, the term "artifact" refers to media (e.g., audio, video, multimedia, images, slideshows, charts, etc.) presented or recorded in an electronic meeting, software executed during an electronic meeting for the purpose of demonstration and/or electronic meeting collaboration tools (e.g., polling, questions and answers, embedded chats, and the like). In one arrangement, the system loading information 126 can be derived based on historical data relating to meetings hosted by the electronic meeting system 108 and/or historical data relating to meetings being hosted by one or more other electronic meeting systems.

As will be described, to accommodate the meeting request 104, the meeting scheduler 106 may make changes to other meetings scheduled in the same time slot indicated in the meeting request 104. When such changes occur, the meeting scheduler 106 can generate appropriate messages 112 regarding such changes to one or more users identified as primary contacts for information regarding the other meetings. For example, the messages 112 can be sent to users who originally scheduled the other meetings or who are tasked with managing the other electronic meetings (e.g., meeting moderators). Such users can receive the messages 112 via respective clients 114.

Figure 2:
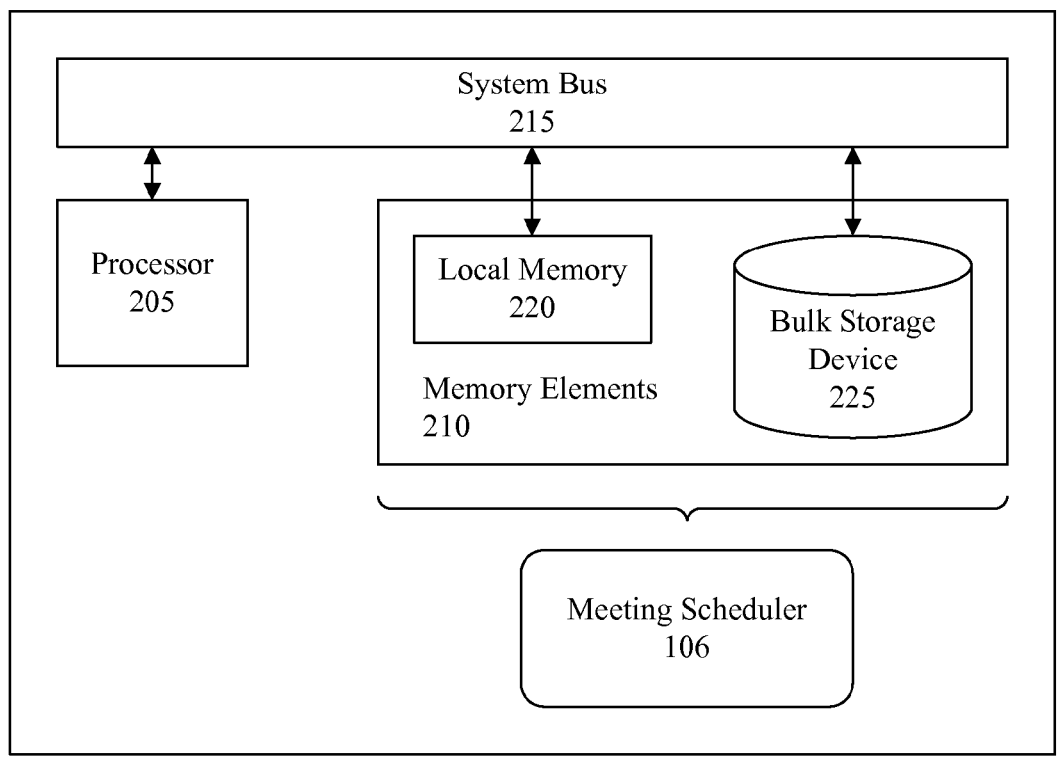
FIG. 2 is a block diagram of a system configured to execute a meeting scheduler in accordance with one embodiment disclosed within this specification

FIG. 2 is a block diagram of a system 200 configured to execute the meeting scheduler 106 in accordance with one embodiment disclosed within this specification. The system 200 can correspond to the client 102, the electronic meeting system 108, or any other processing system on which the meeting scheduler 106 may be executed.

The system 200 can include at least one processor 205 coupled to memory elements 210 through a system bus 215 or other suitable circuitry. As such, the system 200 can store program code within memory elements 210. The processor 205 can execute the program code accessed from memory elements 210 via the system bus 215. In one aspect, for example, the system 200 can be implemented as a computer that is suitable for storing and/or executing program code. It should be appreciated, however, that the system 200 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to RAM or other non-persistent memory device(s) generally used during actual execution of the program code. The bulk storage device(s) 225 can be implemented as a hard disk drive (HDD), solid state drive (SSD), or other persistent data storage device. The system 200 also can include one or more cache memories (not shown) that provide temporary storage of at least some program code in order to reduce the number of times program code must be retrieved from the bulk storage device 225 during execution.

Input/output (I/O) devices such as a keyboard, a display, and a pointing device optionally can be coupled to the system 200. The I/O devices can be coupled to the system 200 either directly or through intervening I/O controllers. One or more network adapters also can be coupled to the system 200 to enable the system 200 to become coupled to other systems, computer systems, remote printers, and/or remote storage devices through intervening private or public networks. Modems, cable modems, and Ethernet cards are examples of different types of network adapters that can be used with the system 200.

As pictured in FIG. 2, the memory elements 210 can store the meeting scheduler 106. The meeting scheduler 106, being implemented in the form of executable program code, can be executed by the system 200 and, as such, can be considered part of the system 200.

Figure 3:
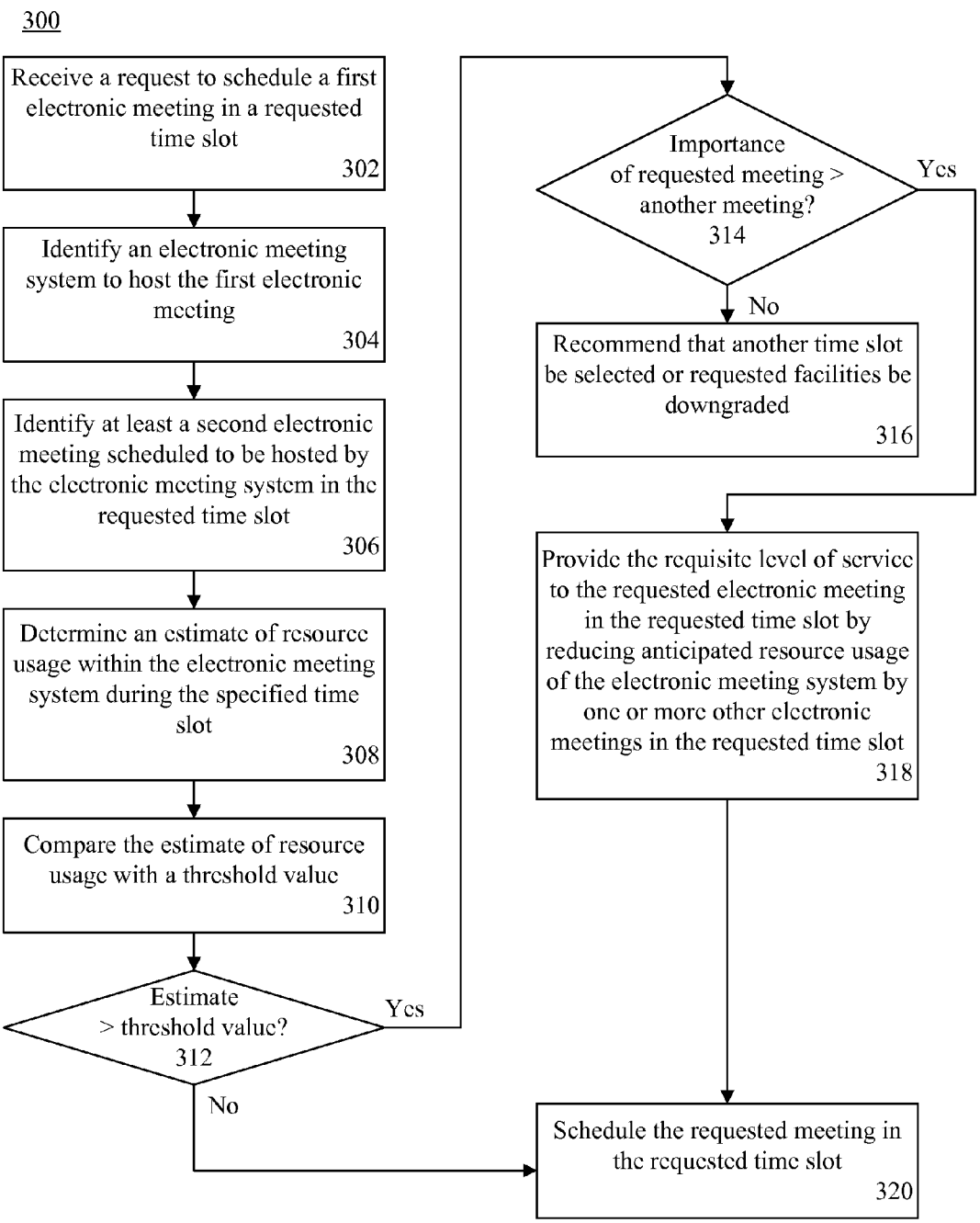
FIG. 3 is a flow chart illustrating a method of providing a requisite level of service for an electronic meeting in accordance with another embodiment disclosed within this specification.

FIG. 3 is a flow chart illustrating a method 300 of providing a requisite level of service for an electronic meeting in accordance with another embodiment disclosed within this specification. Referring both to FIG. 1 and FIG. 3, at step 302, the meeting scheduler 106 can receive from the client 102 the meeting request 104, which requests that an electronic meeting be scheduled in a requested time slot indicated in the meeting request 104. The time slot can be a present time slot or a future time slot.

At step 304, an electronic meeting system to host the first electronic meeting, such as the electronic meeting system 108, can be identified. In one arrangement, the meeting scheduler 106 can identify a plurality of electronic meeting systems that may be available to host the requested electronic meeting, and select the electronic meeting system 108 from among the available systems.

At step 306, at least a second electronic meeting scheduled to be hosted by the electronic meeting system in the requested time slot can be identified. For example, the meeting scheduler 106 can access a schedule of electronic meetings, such as the meeting calendar 120, to determine whether any other meetings are scheduled to be hosted by the electronic meeting system 108 in the specified time slot. If so, the meeting scheduler 106 can identify such meetings that are associated with the specified time slot.

At step 308, the meeting scheduler 106 can determine an estimate of resource usage within the electronic meeting system 108 during the specified time slot. The estimate of resource usage can be based on resources of the electronic meeting system 108 expected to be used by any such other meetings and the resources expected to be used for the requested meeting. The resources can be processing resources, memory resources, or any other resources used by the electronic meeting system 108 to host electronic meetings. The estimation can be based on system loading information 126, which may be accessed by the meeting scheduler 106.

At step 310, the meeting scheduler 106 can compare the estimate of resource usage to a threshold value. Such comparison can be implemented to determine whether the electronic meeting system 108 has adequate resources to host the requested meeting as well as any other meetings scheduled in the same time slot. The threshold value can be a value that indicates a maximum desired use of electronic meeting system resources. In illustration, the threshold value can indicate a desired maximum number of instructions per second to be performed by the processor, a desired maximum amount of memory to be used, and/or any other measurable parameters relating to operation of the electronic meeting system 108. The threshold value can directly correspond to the electronic meeting system's maximum capabilities, or can be lower than the electronic meeting system's maximum capabilities in order to leave headroom for other processes that may occur.

Referring to decision box 312, if the estimate of resource usage does not exceed the threshold value, at step 320 the meeting scheduler 106 can schedule the requested meeting in the requested time slot. If, however, the estimate of resource usage does exceed the threshold value, the process can proceed to decision box 314.

At decision box 314 the meeting scheduler 106 can compare a measure of importance of the requested meeting to the measure(s) of importance of the other meeting(s) scheduled in the same time slot. The measures of importance can be based on any suitable parameters or combination of parameters. For example, the measure of importance for each electronic meeting can be based on a position within an organizational hierarchy 122 of the person who scheduled the respective electronic meeting, positions within the organizational hierarchy 122 of attendees scheduled for the respective electronic meeting, the number of attendees scheduled for the respective electronic meeting, the scheduled duration of the respective electronic meeting, when the request to schedule the respective electronic meeting was received by the meeting scheduler 106, a service level agreement (e.g., a quality of service (QoS)) applicable to the respective electronic meeting, for example as indicated in one or more service level agreements 124, and so on. When determining the measure of importance for the electronic meetings based on the number of attendees scheduled for the respective electronic meetings, the meeting scheduler 106 can consider (i.e., process) the number of attendees potentially impacted by rescheduling one or more electronic meetings and/or whether such attendees may be adversely affected by downgrading facilities provided in the respective electronic meetings.

If the measure of importance of the requested meeting is not greater than a respective measure of importance of at least one other meeting scheduled for the same time slot, at step 316 the meeting scheduler 106 can generate a message to the client 102 indicating that it is recommended that another time slot be selected or requested facilities to be provided for the requested meeting be downgraded. In illustration, the meeting scheduler 106 can identify one or more other time slots in which the electronic meeting system 108 is expected to have sufficient resources available to provide a desired Quality of Service (QoS) as indicted by the applicable service level agreement(s) 124, and the message sent to the client 102 can indicate to the person that the other time slots are available. Further, the message can indicate that if the person scheduling the meeting still desires to use the originally requested time slot for the electronic meeting, access to one or more features of the electronic meeting can be limited or restricted. In the message, the meeting scheduler 106 can provide a list of electronic meeting features, and prompt the person to select which features to limit or restrict. In response to receiving a selection of one or more of these features from the person (e.g., via the client 102), the meeting scheduler can return to step 310 and decision box 312 to determine whether the estimate of resource usage with the limited feature set will still exceed the threshold value, and the process can continue.

If, however, the measure of importance of the requested meeting is higher than at least one respective measure of importance of another meetings scheduled in the same time slot, at step 318 the requisite level of service (e.g., QoS) can be provided to the requested electronic meeting in the requested time slot by reducing anticipated resource usage of the electronic meeting system by one or more of the other electronic meetings in the requested time slot having a measure of importance that is lower than the measure of importance for the meeting being scheduled.

In one arrangement, the resource usage can be reduced by allocating one or more of such other meetings to another time slot. For example, calendar information associated with at least one attendee of another meeting being moved can be accessed by the meeting scheduler 106, and the meeting scheduler 106 can select another time slot based on the calendar information. In illustration, the meeting scheduler 106 can access calendar information for each of the electronic meeting attendees and the meeting moderator, and identify a time slot in which the electronic meeting attendees and the meeting moderator do not have other commitments. If no other open time slots are identified, the meeting scheduler 106 can generate a message, such as an electronic mail, instant message or pop-up window, to the person who scheduled the electronic meeting to be moved to request that the person select another time slot. In the message time slots proximately located in time to the original time slot, and for which resources of the electronic meeting system 108 are available to host the electronic meeting, can be identified. In the case that the meeting scheduler 106 automatically selects a new time slot, the meeting scheduler 106 can send a message to the person who scheduled the meeting and all meeting attendees indicating the new time slot for the meeting. Further, the meeting scheduler 106 can automatically update their respective calendars with the electronic meeting event.

In another arrangement, the resource usage of one or more other meetings scheduled in the requested time slot can be automatically reduced. For example, access to one or more features of another electronic meeting can be limited. For instance, the number of authorized attendees can be reduced, usage of artifacts in the other electronic meeting can be limited or prohibited, use of group/forum capabilities can be limited or prohibited, use of in-meeting instant messaging can be limited or prohibited, gesture recognition can be limited or prohibited, use of unified telephone capabilities can be limited or prohibited, and so on. In an arrangement in which use of unified telephone capabilities is limited or prohibited, the meeting scheduler can provide a telephone number to attendees to dial into the electronic meeting system 108. The reduction of resource usage can be implemented in accordance with the QoS indicated by respective service level agreement(s) 124 associated with the other electronic meetings. For instance, the service level agreements 124 can indicate which electronic meeting features are optionally provided based on the electronic meeting system's available resources in the time slot in which the electronic meetings are scheduled. If the electronic meeting system 108 has available resources, the features can be made available to the other electronic meetings. If not, then the features can be downgraded (e.g., limited or prohibited).

In yet another arrangement, a message can be sent to the person who scheduled the other electronic meeting or the moderator of such electronic meeting to inquire whether the electronic meeting should be moved to another time slot or resource usage should be reduced in order to keep the electronic meeting in the same time slot. The person or moderator can select which option she prefers, and the electronic meeting can be moved or kept in the same time slot with reduced resource use in accordance with the selection.

At step 320, the requested meeting can be scheduled in the requested time slot.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "include" and/or "including," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer program product for providing a requisite level of service for an electronic meeting, the computer program product comprising:

a computer readable storage device having stored thereon program code that, when executed, configures a processor to perform executable operations comprising:

receiving a request to schedule a first electronic meeting in a future time slot;

identifying an electronic meeting system to host the first electronic meeting;

identifying at least a second electronic meeting scheduled to be hosted by the electronic meeting system in the future time slot;

determining an estimate of resource usage within the electronic meeting system during the future time slot at least based on the second electronic meeting being scheduled to be hosted by the electronic meeting system in the future time slot;

comparing the estimate of resource usage with a threshold value;

responsive to determining that the estimate of resource usage exceeds the threshold value, providing the requisite level of service to the first electronic meeting in the future time slot by reducing anticipated resource usage of the electronic meeting system by the second electronic meeting in the future time slot; and scheduling the first electronic meeting in the future time slot.

2. The computer program product of claim 1, wherein identifying at least the second electronic meeting scheduled to be hosted by the electronic meeting system in the future time slot comprises:

accessing a schedule of electronic meetings; and within the schedule of electronic meetings, identifying the second electronic meeting being associated with the future time slot.

3. The computer program product of claim 1, wherein the program code, when executed, further configures the processor to perform executable operations comprising:

comparing a first measure of importance of the first electronic meeting to a second measure of importance of the second electronic meeting.

4. The computer program product of claim 3, wherein reducing anticipated resource usage of the electronic meeting system by the second electronic meeting in the future time slot comprises:

responsive to determining that the first measure of importance is higher than the second measure of importance, rescheduling the second electronic meeting to another time slot.

5. The computer program product of claim 4, wherein rescheduling the second electronic meeting to another time slot comprises:

accessing calendar information associated with at least one attendee of the second electronic meeting; and selecting the other time slot based on the calendar information.

6. The computer program product of claim 3, wherein reducing anticipated resource usage of the electronic meeting system by the second electronic meeting in the future time slot comprises:

responsive to determining that the first measure of importance is higher than the second measure of importance, limiting access to at least one feature of the second electronic meeting.

7. The computer program product of claim 6, wherein limiting access to at least one feature of the second electronic meeting comprises:

reducing a number of authorized attendees of the second electronic meeting.

8. The computer program product of claim 6, wherein limiting access to at least one feature of the second electronic meeting comprises:

restricting usage of meeting artifacts in the second electronic meeting.

9. The computer program product of claim 3, wherein:

the first measure of importance is based on a position within an organizational hierarchy of a first person who schedules the first electronic meeting; and the second measure of importance is based on a position within the organizational hierarchy of a second person who schedules the second electronic meeting.

10. A computer program product for providing a requisite level of service for an electronic meeting, the computer program product comprising:

a computer readable storage device having stored thereon program code that, when executed, configures a processor to perform executable operations comprising:

receiving a request to schedule a first electronic meeting in a present time slot;

identifying an electronic meeting system to host the first electronic meeting;

identifying at least a second electronic meeting being hosted by the electronic meeting system in the present time slot;

determining resource usage within the electronic meeting system during the present time slot at least based on the second electronic meeting being hosted by the electronic meeting system in the present time slot;

comparing the estimate of resource usage with a threshold value;

responsive to determining that the estimate of resource usage exceeds the threshold value, providing the requisite level of service to the first electronic meeting in the present time slot by reducing resource usage of the electronic meeting system by the second electronic meeting in the present time slot; and scheduling the first electronic meeting in the present time slot.

11. A system comprising:

a processor programmed to initiate executable operations comprising:

receiving a request to schedule a first electronic meeting in a future time slot;

identifying an electronic meeting system to host the first electronic meeting;

identifying at least a second electronic meeting scheduled to be hosted by the electronic meeting system in the future time slot;

determining an estimate of resource usage within the electronic meeting system during the future time slot at least based on the second electronic meeting being scheduled to be hosted by the electronic meeting system in the future time slot;

comparing the estimate of resource usage with a threshold value;

responsive to determining that the estimate of resource usage exceeds the threshold value, providing the requisite level of service to the first electronic meeting in the future time slot by reducing anticipated resource usage of the electronic meeting system by the second electronic meeting in the future time slot; and scheduling the first electronic meeting in the future time slot.

12. The system of claim 11, wherein identifying at least the second electronic meeting scheduled to be hosted by the electronic meeting system in the future time slot comprises:

accessing a schedule of electronic meetings; and within the schedule of electronic meetings, identifying the second electronic meeting being associated with the future time slot.

13. The system of claim 11, the executable operations further comprising:

comparing a first measure of importance of the first electronic meeting to a second measure of importance of the second electronic meeting.

14. The system of claim 13, wherein reducing anticipated resource usage of the electronic meeting system by the second electronic meeting in the future time slot comprises:

responsive to determining that the first measure of importance is higher than the second measure of importance, rescheduling the second electronic meeting to another time slot.

15. The system of claim 14, wherein rescheduling the second electronic meeting to another time slot comprises:

accessing calendar information associated with at least one attendee of the second electronic meeting; and selecting the other time slot based on the calendar information.

16. The system of claim 13, wherein reducing anticipated resource usage of the electronic meeting system by the second electronic meeting in the future time slot comprises:
responsive to determining that the first measure of importance is higher than the second measure of importance, limiting access to at least one feature of the second electronic meeting.

17. The system of claim 16, wherein limiting access to at least one feature of the second electronic meeting comprises:
reducing a number of authorized attendees of the second electronic meeting.

18. The system of claim 16, wherein limiting access to at least one feature of the second electronic meeting comprises:
restricting usage of meeting artifacts in the second electronic meeting.

19. The system of claim 13, wherein:
the first measure of importance is based on a position within an organizational hierarchy of a first person who schedules the first electronic meeting; and
the second measure of importance is based on a position within the organizational hierarchy of a second person who schedules the second electronic meeting.

* * * * *